(12) United States Patent
Kim et al.

(10) Patent No.: US 11,196,936 B1
(45) Date of Patent: Dec. 7, 2021

(54) MOBILE TERMINAL AND METHOD FOR CONTROLLING THE SAME

(71) Applicant: LG ELECTRONICS INC., Seoul (KR)

(72) Inventors: Jongpil Kim, Seoul (KR); Dongjin Lee, Seoul (KR); Jaekyung Ryu, Seoul (KR); Sungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/030,493

(22) Filed: Sep. 24, 2020

(30) Foreign Application Priority Data

Jul. 21, 2020 (WO) ................ PCT/KR2020/009619

(51) Int. Cl.
*H04N 5/225* (2006.01)
*H04N 5/235* (2006.01)
*H04M 1/02* (2006.01)

(52) U.S. Cl.
CPC ........ *H04N 5/2354* (2013.01); *H04M 1/0264* (2013.01); *H04N 5/2252* (2013.01); *H04N 5/2256* (2013.01)

(58) Field of Classification Search
CPC .................................................. H04N 5/2256
USPC .................................................. 348/370, 371
See application file for complete search history.

(56) References Cited

U.S. PATENT DOCUMENTS

| | | | |
|---|---|---|---|
| 10,250,727 B2 * | 4/2019 | Aberle | G02B 15/04 |
| 10,715,647 B2 * | 7/2020 | Li | H04M 1/22 |
| 2014/0146225 A1 | 5/2014 | Chen | |
| 2014/0253799 A1 * | 9/2014 | Moon | H04N 5/2253 348/376 |
| 2016/0314374 A1 * | 10/2016 | Braumandl | H04N 5/2252 |
| 2019/0087640 A1 * | 3/2019 | Miyasaka | H04N 5/23219 |
| 2019/0238741 A1 * | 8/2019 | Atkinson | G01C 3/08 |
| 2019/0369678 A1 * | 12/2019 | Park | H04M 1/0264 |

(Continued)

FOREIGN PATENT DOCUMENTS

| | | |
|---|---|---|
| CN | 107490922 | 12/2017 |
| CN | 209375764 | 9/2019 |
| CN | 209572071 | 11/2019 |

OTHER PUBLICATIONS

PCT International Application No. PCT/KR2020/009619, International Search Report dated Apr. 20, 2021, 9 pages.

*Primary Examiner* — Anthony J Daniels
(74) *Attorney, Agent, or Firm* — Lee, Hong, Degerman, Kang & Waimey

(57) ABSTRACT

The present invention is to provide a mobile terminal and a method for controlling the same that may secure an appropriate amount of light for a subject and minimize a shadow of the subject even when capturing an image in a close-up manner using a camera embedded in the mobile terminal. One aspect of the present disclosure proposes a mobile terminal including a rear cover having an opening defined therein, a camera disposed to be optically exposed to the outside through the opening, a flash surrounding the camera, wherein the flash is disposed to be optically exposed to outside through the opening, a support frame surrounding the flash and being attached to one surface of the rear cover corresponding to a periphery of the opening while being externally exposed to outside through the opening, and a cover glass attached to the support frame to cover the camera and the flash.

10 Claims, 10 Drawing Sheets

(56) References Cited

U.S. PATENT DOCUMENTS

2020/0186630 A1\* 6/2020 Bao ..................... H04N 5/2252
2020/0195292 A1 6/2020 Liu et al.

\* cited by examiner

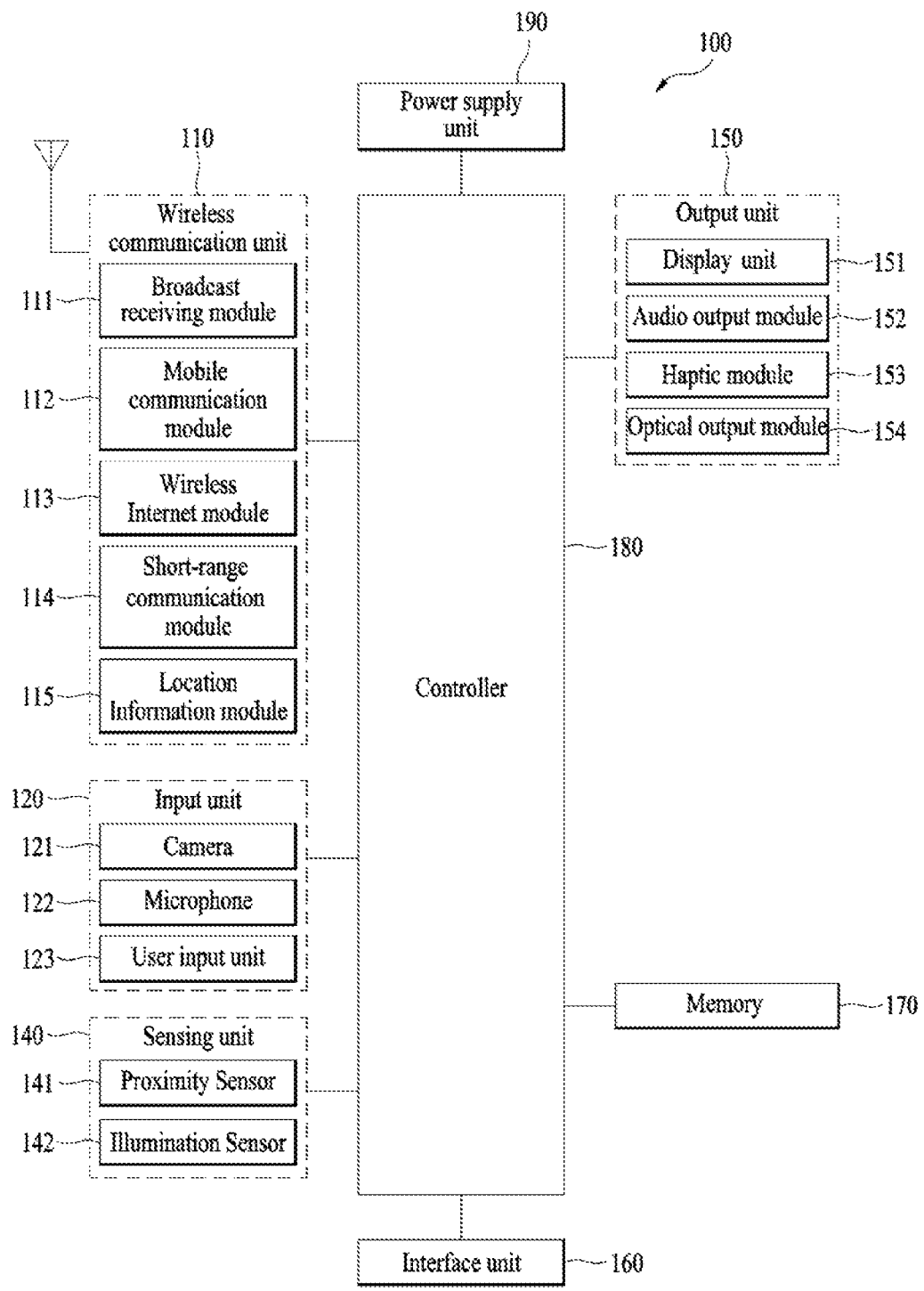

(2-1)

(2-2)

(3-1)

(3-2)

(3-3)

(8-1) (8-2)

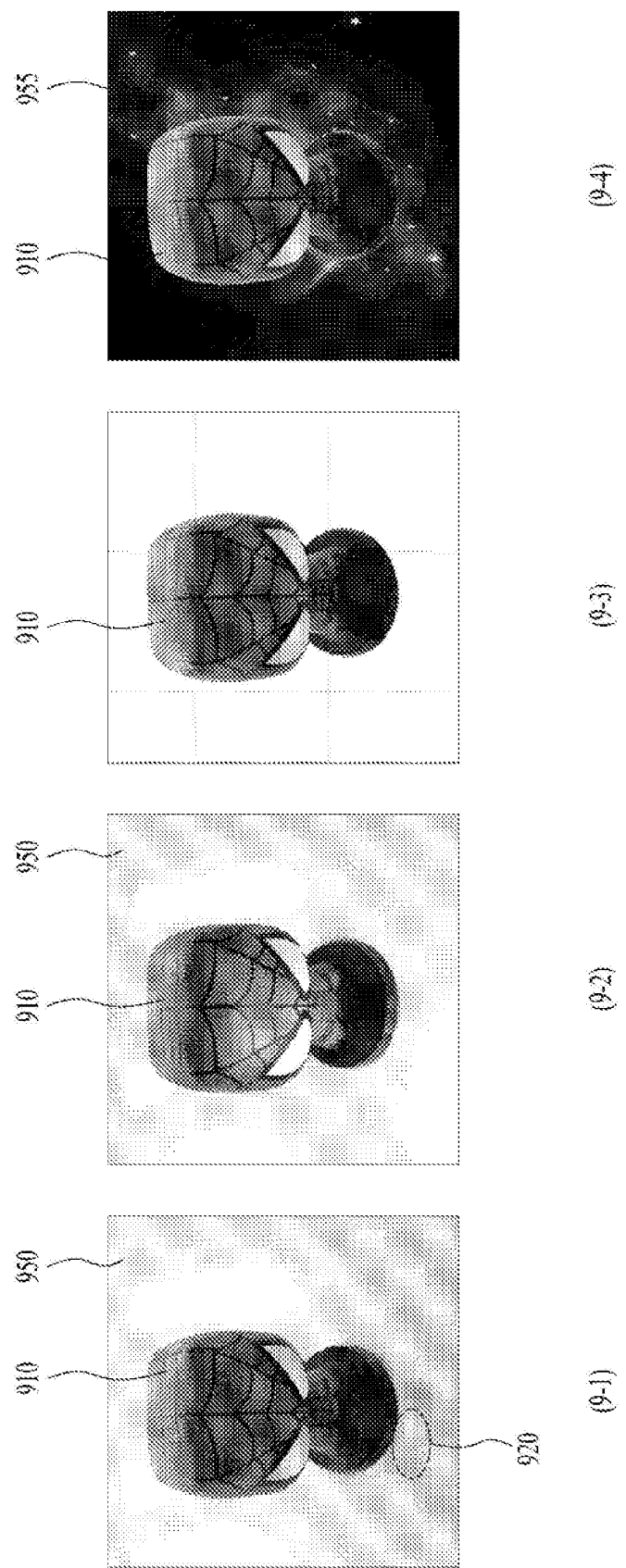

MOBILE TERMINAL AND METHOD FOR CONTROLLING THE SAME

Pursuant to 35 U.S.C. § 119, this application claims the benefit of earlier filing date and right of priority to International Application No. PCT/KR2020/009619, filed on Jul. 21, 2020, the contents of which are all hereby incorporated by reference herein in its entirety.

BACKGROUND

Field

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Mobile terminals may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Efforts are ongoing to support and increase the functionality of mobile terminals. Such efforts include software and hardware improvements, as well as changes and improvements in the structural components.

In recent years, utilization of the camera equipped in the mobile terminal is increasing. However, there is a problem in that, when capturing an image in a close-up manner using the camera equipped in the mobile terminal, a main body of the mobile terminal blocks ambient light directed toward a subject, and thus, it is difficult to secure an appropriate amount of light for the subject.

Even when capturing the image in the close-up manner using a flash embedded in the mobile terminal together with the camera, because a distance between the flash and the subject is small, light irradiated from the flash is not evenly irradiated to an entirety of the subject and is concentrated only on a specific portion of the subject. Thus, it is still difficult to secure the appropriate amount of light for the subject. In addition, when the flash is embedded in the mobile terminal to be spaced apart from the camera at a distance equal to or greater than a predetermined distance, light irradiated from the flash rather generates a shadow of the subject, so that it is difficult to distinguish the subject from a background thereof.

SUMMARY

Accordingly, embodiments of the present invention are directed to a mobile terminal and a method of controlling the mobile terminal that substantially obviate one or more problems due to limitations and disadvantages of the related art.

That is, a purpose of the present invention is to provide a mobile terminal and a method for controlling the same that may secure an appropriate amount of light for a subject and minimize a shadow of the subject even when capturing an image in a close-up manner using a camera embedded in the mobile terminal.

One aspect of the present disclosure proposes a mobile terminal including a rear cover having an opening defined therein, a camera disposed to be optically exposed to the outside through the opening, a flash surrounding the camera, wherein the flash is disposed to be optically exposed to the outside through the opening, a support frame surrounding the flash and being attached to one surface of the rear cover corresponding to a periphery of the opening while being externally exposed to the outside through the opening, and a cover glass attached to the support frame to cover the camera and the flash.

In one implementation, the rear cover may include a first cover and a second cover, the opening may be defined in the first cover and an opening having a larger diameter than the opening may be defined in the second cover, and the first cover and the second cover may overlap with each other such that centers of the respective openings correspond to each other.

In one implementation, the support frame may be attached to one surface of the first cover exposed from the second cover.

In one implementation, the first cover may be made of a glass material.

In one implementation, the support frame may be inserted into the opening in a direction from said one surface of the rear cover to the other surface of the rear cover to protrude from the rear cover.

In one implementation, said one surface of the rear cover may be directed inward of a main body of the mobile terminal, and the other surface of the rear cover may be directed outward of the main body.

In one implementation, a cross-section of a light emitting portion of the flash may be semicircular.

In one implementation, the mobile terminal may further include a plurality of cameras, and the flash may be disposed to surround a camera for close-up among the plurality of cameras.

In one implementation, the flash may be able to operate in conjunction with not only the camera for the close-up but also other cameras among the plurality of cameras.

In one implementation, the cover glass may be attached to the support frame in an airtight manner, and the support frame may be attached to the rear cover in an airtight manner.

In one implementation, the support frame may include a protruding portion inserted into the opening, and a fixed portion extending parallel to the rear cover and fixed to the rear cover, and a step may be formed at an end of the protruding portion, and the cover glass is seated on the step.

In one implementation, one surface of the fixed portion may be attached to the rear cover with an adhesive tape, and the other surface of the fixed portion may face a printed circuit board (PCB) of the camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 9 is a view for illustrating segmentation processing of an image captured by a camera equipped with a ring flash.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
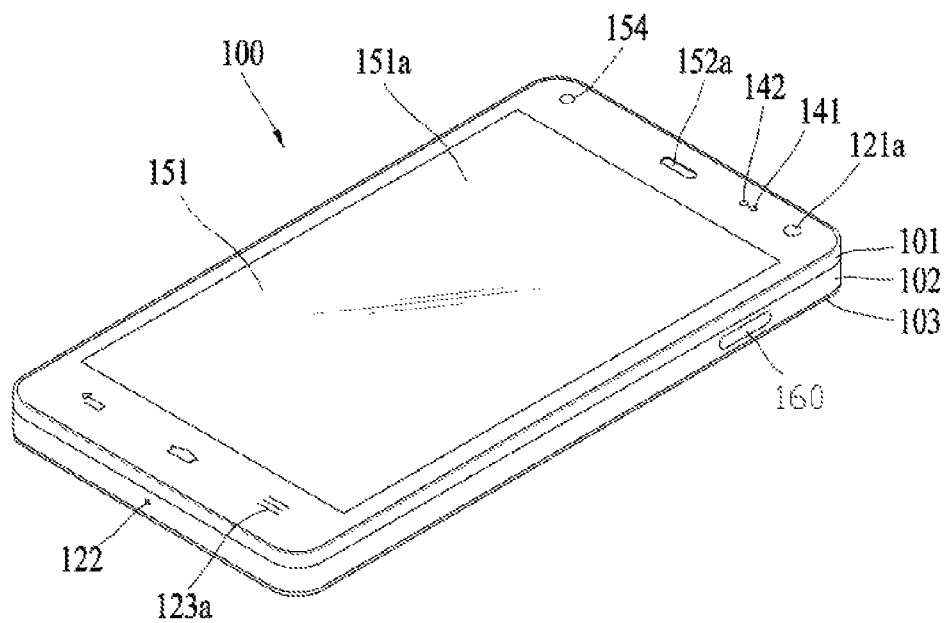
FIGS. 1B and 1C are conceptual views of one example of the mobile terminal, viewed from different directions.
Figure 1C:
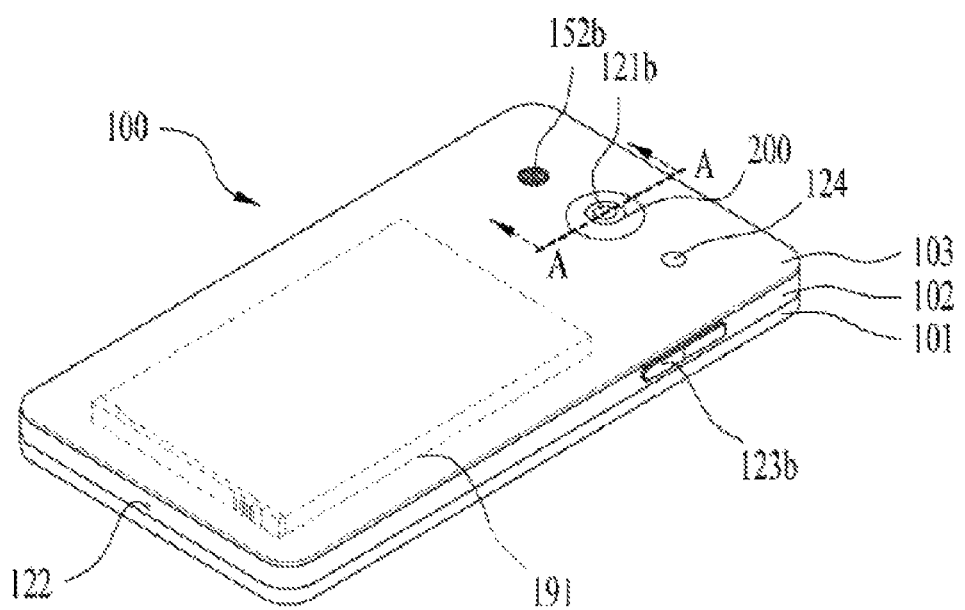

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement an operation, control, or a control method of the mobile terminal according to various embodiments to be described below. In addition, the operation, the control, or the control method of the mobile terminal may be implemented on the mobile terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. A ring flash 200 may be disposed with respect to the camera 121b, which will be described again later.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. The flash 124 may be disposed additionally and separately from the ring flash 200.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
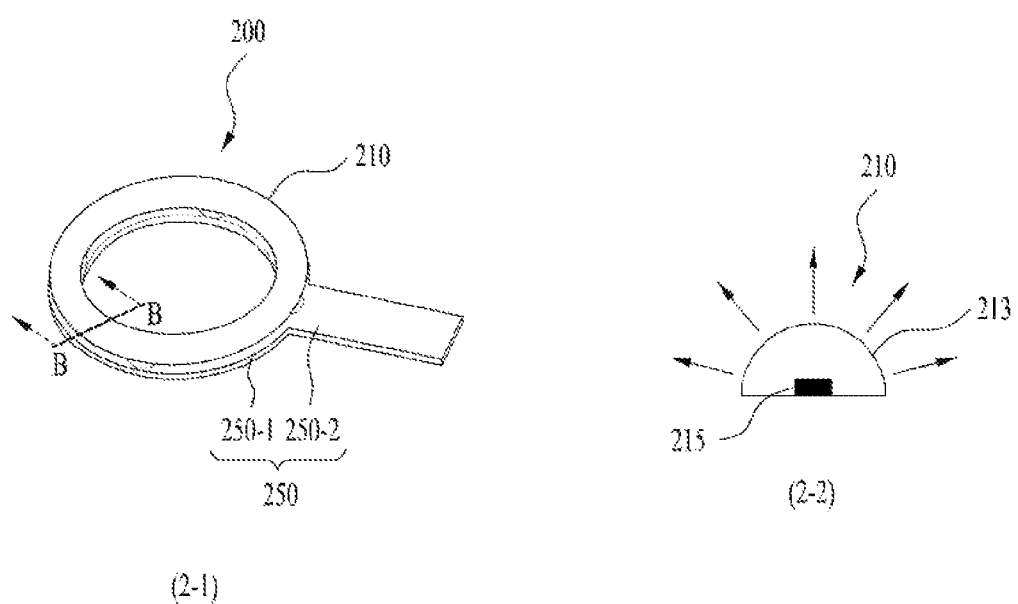
FIG. 2 shows a perspective view and a cross-sectional view of a ring flash 200 shown in FIG. 1C.

First, the ring flash 200 described above will be described with further reference to FIG. 2. FIG. 2 shows a perspective view and a cross-sectional view of the ring flash 200 shown in FIG. 1C.

As shown in (2-1) in FIG. 2, the ring flash 200 may include a light emitting portion 210 and a printed circuit board (PCB) 250.

As shown in (2-2) in FIG. 2, which is a cross-sectional view taken along a line B-B of (2-1) in FIG. 2, a cross-section of the light emitting portion 210 may be semicircular. In addition, the light emitting portion 210 may include a diffuser lens 213 and a light emitting device 215, such as a light emitting diode (LED). The reason why the cross-section of the light emitting portion 210 is semicircular is to allow light to be irradiated while spreading widely, so that the light may be evenly irradiated to a wide region without being irradiated only to a specific partial region. When the light is able to be evenly irradiated to the wide region, the cross-section of the light emitting portion 210 may have a shape (for example, a trapezoidal rectangle) other than the semicircular shape.

The PCB 250 may include a first PCB 250-1 to be coupled to a rear surface of the light emitting portion 210 and a second PCB 250-1 to be connected to a main board (not shown) in the mobile terminal 100. At least the second PCB 250-2 among the first PCB 250-1 and the second PCB 250-2 may be formed as a flexible PCB to increase convenience of connection with the main board.

Hereinafter, the ring flash 200 will be described with further reference to FIG. 3.

Figure 3:
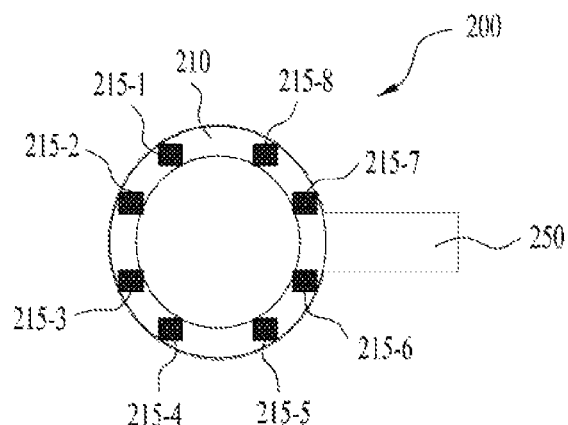
FIG. 3 shows a plan view and a side view of a ring flash 200 and a plan view of a PCB shown in FIG. 2.
Figure 3:
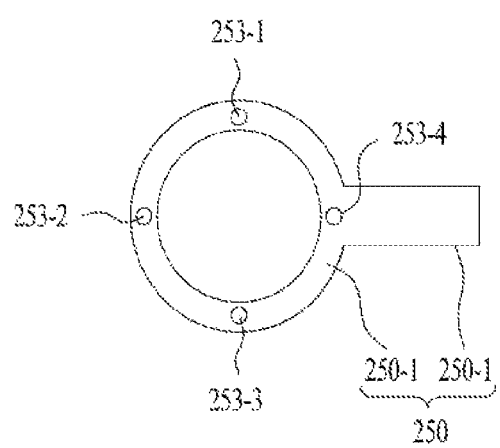
Figure 3:
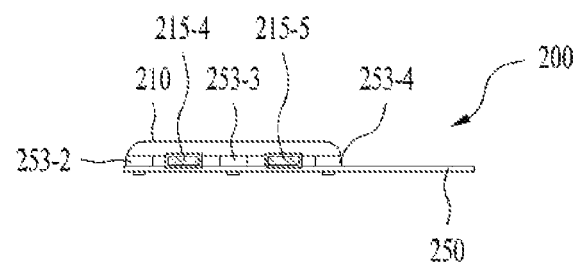

FIG. 3 shows a plan view and a side view of the ring flash 200 and a plan view of the PCB shown in FIG. 2.

Specifically, (3-1) in FIG. 3 shows a plan view of the ring flash 200 shown in FIG. 2.

As shown in (3-1) in FIG. 3, the light emitting portion 210 may be formed in a circular donut shape and may serve as a kind of a line light source rather than a point light source. When being able to serve as the line light source, the light emitting portion 210 may be formed in a different shape. For example, the light emitting portion 210 may be formed in a rectangular donut shape. The light emitting portion 210 is shown in a donut shape of a closed curve in (3-1) in FIG. 3, but the light emitting portion 210 may not be necessarily in the closed curve shape and may be in a non-closed curve shape when being able to serve as the line light source.

In this connection, as shown in (3-1) in FIG. 3, a plurality of light emitting devices 215-1 to 215-8 may be arranged to be spaced apart from each other at uniform intervals inside the light emitting portion 210. Although it is shown that eight light emitting devices 215-1 to 215-8 are arranged in FIG. 3-1) in FIG. 3, the number of light emitting device may be greater or less than 8.

(3-2) in FIG. 3 shows a plan view of the PBC 250 shown in FIG. 2.

As shown in (3-2) in FIG. 3, a plurality of connectors 253-1 to 253-4 to be connected to the light emitting portion 210 may be arranged on the PCB 250.

(3-3) in FIG. 3 shows a side view of the ring flash 250 shown in FIG. 2.

In (3-3) in FIG. 3, it is shown that some 215-4 and 215-5 of the plurality of light emitting devices and some 253-2, 253-3, and 253-4 of the plurality of connectors described above may be externally visible through a side surface of the ring flash 250.

Hereinafter, a structure in which the ring flash 200 formed as described above is coupled to the mobile terminal will be described with further reference to FIG. 4.

Figure 4:
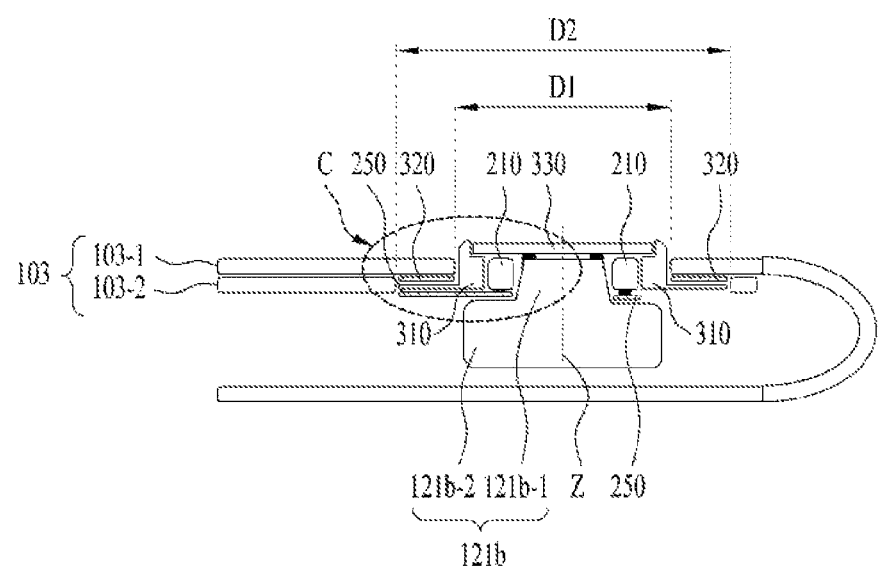
FIG. 4 is a cross-sectional view taken along a line A-A shown in FIG. 1C.

FIG. 4 is a cross-sectional view taken along a line A-A shown in FIG. 1C.

As shown in FIG. 4, a first opening having a first diameter D1 may be defined in the rear cover 103. The first opening may be circular so as to correspond to the circular donut shape of the light emitting portion, but may be in other shapes (e.g., a rectangle).

In a more detailed description of the rear cover 103, the rear cover 103 may include a first cover 103-1 and a second cover 103-2. In particular, the first cover 103-1 may be made of a glass material.

The first opening of the first diameter D1 may be defined in the first cover 103-1. In addition, a second opening having a second diameter D2 larger than the first diameter D1 may be defined in the second cover 103-2.

The first cover 103-1 and the second cover 103-2 may be overlapped such that centers of the first opening and the second opening correspond to each other to form the rear cover 103.

The first cover 103-1 may be directed outward of the mobile terminal 100, and the second cover 103-2 may be directed inward of the mobile terminal 100.

Accordingly, it may be externally visible that the rear cover 103 formed by the first cover 103-1 and the second cover 103-2 overlapped with each other has only the first opening defined therein.

The camera 121b may be disposed to be optically exposed to the outside through the first opening.

In a more detailed description of the camera 121b, the camera 121b may include an optical lens 121b-1 and a sensor module 121b-2.

The optical lens 121b-1 is optically exposed to the outside through the first opening, so that the camera 121b may be disposed to receive light from the external subject.

In addition, the camera 121b may be disposed such that an optical axis Z of the optical lens 121b-1 corresponds to the centers of the first opening and the second opening.

The ring flash 200 as shown in FIGS. 2 and 3 may be optically exposed to the outside through the first opening while surrounding the optical lens 121b-1, and the PCB 250 may be disposed to be horizontal with the rear cover 103. In addition, at least the first PCB 250-1 of the PCB 250 may be disposed to be supported by the sensor module 121b-2 of the camera 121b.

Figure 5:
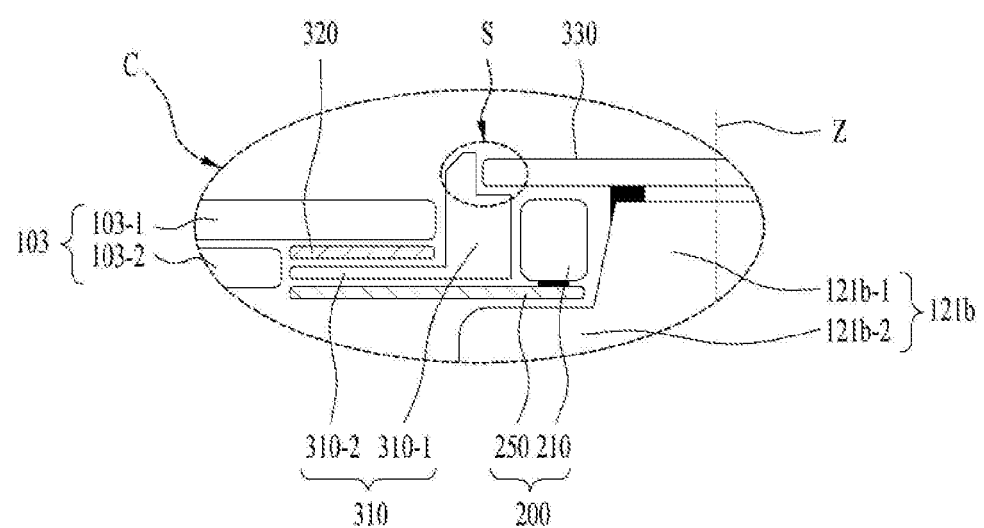
FIG. 5 is an enlarged view of a region C of FIG. 4.

A support frame 310 may be disposed to surround the ring flash 200 and to be attached to one surface of the rear cover corresponding to a periphery of the first opening while being externally exposed to the outside through the first opening. A disposition of the support frame will be described with further reference to FIG. 5. FIG. 5 is an enlarged view of a region C in FIG. 4.

The support frame 310 may include a protruding portion 310-1 inserted into the first opening and a fixed portion 310-2 extending parallel to the rear cover 103 and fixed to the first cover 103-1.

The protruding portion 310-1 of the support frame 310 may be disposed to surround the light emitting portion 210 of the ring flash 200. In addition, the protruding portion 310-1 may be disposed to be inserted into the first opening in a direction from one surface of the rear cover 103 directed inward of the mobile terminal 100 to the other surface of the rear cover 103 directed outward of the mobile terminal 100 to protrude from the rear cover.

In addition, one surface of the fixed portion 310-2 of the support frame 310 may be attached to one surface of the first cover 103-1 directed inward of the mobile terminal 100 using an adhesive tape in an airtight manner. In addition, the other surface of the fixed portion 310-2 may face the second PCB 250. The second PCT 250 may extend through a space between the sensor module 121b-2 of the camera 121b and the support frame 310 to be connected to a main board (not shown) of the mobile terminal 100 although not shown.

A region of the first cover 103-1 to which the fixed portion 310-2 is attached may be a region exposed from the second cover by the second opening.

In this connection, a step S may be formed at an end of the protruding portion 310-1 of the support frame 310 in an inward direction toward the optical axis Z.

A cover glass 330 for covering the camera 121b and the flash 200 in an airtight manner may be seated on the step S. The cover glass 330 is a transparent glass material, which may, while physically shielding the first opening together with the support frame 310 in an airtight manner, allow the light from the external subject to be transmitted to the camera 121b and simultaneously allow light irradiated from the flash 200 to be transmitted to the subject.

Although not shown, the cover glass 330 may be attached in an airtight manner without forming the step S at the end of the protruding portion 310-1.

Hereinabove, the structure in which the ring flash 200 is embedded in the mobile terminal 100 for the camera 121b in the case in which one camera 121b is disposed on the rear surface of the mobile terminal 100 as shown in FIG. 1C has been described.

However, a plurality of cameras may be arranged on the rear surface of the mobile terminal 100. This will be described with further reference to FIG. 6.

Figure 6:
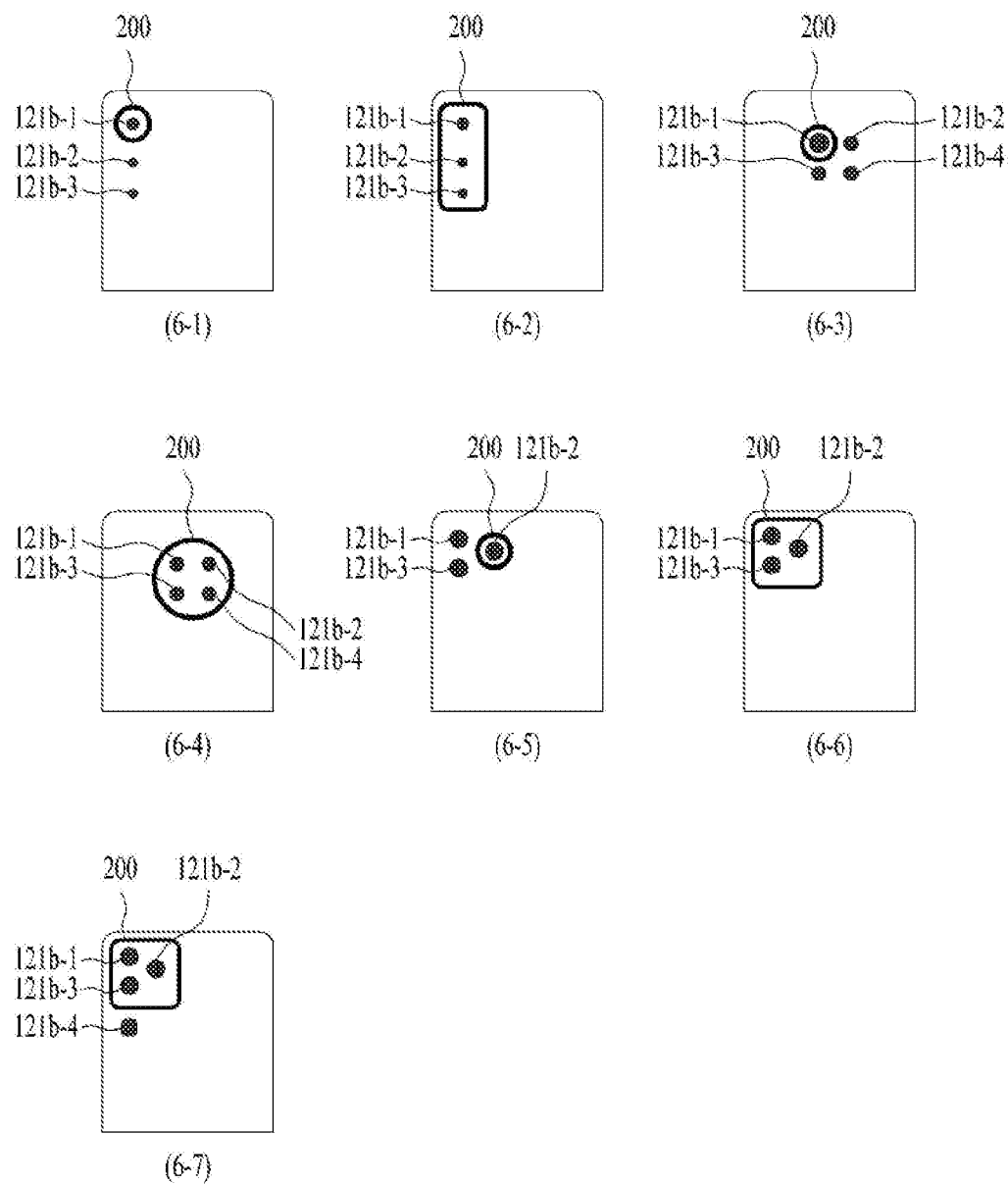
FIG. 6 shows an upper end of a rear surface of a mobile terminal 100 equipped with a plurality of cameras on the rear surface thereof.

FIG. 6 shows an upper end of the rear surface of the mobile terminal 100 equipped with the plurality of cameras on the rear surface thereof.

As shown in (6-1) in FIG. 6, when a first camera 121b-1, a second camera 121b-2, and a third camera 121b-3 are arranged side by side in a vertical direction at the upper end of the rear surface of the mobile terminal 100, the ring flash 200 may be disposed to surround the camera 121b-1 for close-up among the three cameras 121b-1, 121b-2, and 121b-3.

Alternatively, as shown in (6-2) in FIG. 6, when the first camera 121b-1, the second camera 121b-2, and the third camera 121b-3 are arranged side by side in the vertical direction at the upper end of the rear surface of the mobile terminal 100, the ring flash 200 may be disposed to surround all of the three cameras 121b-1, 121b-2, and 121b-3. In this case, the ring flash 200 may have a rectangular shape.

It is shown in (6-1) and (6-2) in FIG. 6 that the three cameras 121b-1, 121b-2, and 121b-3 are vertically arranged, but the three cameras 121b-1, 121b-2, and 121b-3 may be horizontally arranged although not shown.

Alternatively, as shown in (6-3) in FIG. 6, when the first camera 121b-1, the second camera 121b-2, the third camera 121b-3, and a fourth camera 121b-4 are arranged in a matrix layout at the upper end of the rear surface of the mobile terminal 100, the ring flash 200 may be disposed to surround the camera 121b-1 for the close-up among the four cameras 121b-1, 121b-2, 121b-3, and 121b-4.

Alternatively, as shown in (6-4) in FIG. 6, when the first camera 121b-1, the second camera 121b-2, the third camera 121b-3, and the fourth camera 121b-4 are arranged in the matrix layout at the upper end of the rear surface of the mobile terminal 100, the ring flash 200 may be disposed to surround all of the four cameras 121b-1, 121b-2, 121b-3, and 121b-4. In this case, the ring flash 200 may be formed in a circular shape. Although not shown, the ring flash 200 may be formed in a rectangular shape.

Alternatively, as shown in (6-5) in FIG. 6, when the first camera 121b-1, the second camera 121b-2, and the third camera 121b-3 are arranged in a triangular layout at the upper end of the rear surface of the mobile terminal 100, the ring flash 200 may be disposed to surround the second camera 121b-2, which is farthest from a side surface of the mobile terminal 100 among the three cameras 121b-1, 121b-2, and 121b-3.

Alternatively, as shown in (6-6) in FIG. 6, when the first camera 121b-1, the second camera 121b-2, and the third camera 121b-3 are arranged in the triangular layout at the upper end of the rear surface of the mobile terminal 100, the ring flash 200 may be disposed to surround all of the three cameras 121b-1, 121b-2, and 121b-3. In this case, the ring flash 200 may be formed in the rectangular shape.

Alternatively, as shown in (6-7) in FIG. 6, while the first camera 121b-1, the second camera 121b-2, and the third camera 121b-3 are arranged in the triangular layout at the upper end of the rear surface of the mobile terminal 100, the fourth camera 121b-4 may be disposed separately from the triangular layout of the three cameras 121b-1, 121b-2, and 121b-3. The fourth camera 121b-4 may be a high magnification zoom camera. In this case, the ring flash 200 may be disposed to surround only the three cameras 121b-1, 121b-2, and 121b-3. This is because the high magnification zoom camera captures the subject in the distance in many cases, and in this case, it is difficult for the ring flash to irradiate light to the subject in the distance, so that the ring flash is not able to greatly help in capturing a picture using the high magnification zoom camera.

It is shown in (6-1), (6-3), (6-5), and (6-7) in FIG. 6 that the ring flash is disposed to surround only specific camera(s) among the plurality of cameras. In this case, the ring flash does not have to be operated only for the specific camera. The controller 180 may control the ring flash to operate in conjunction even when capturing the picture or the moving image using a camera other than the specific camera among the plurality of cameras.

Hereinafter, with further reference to FIG. 7, light emission of the ring flash 200 will be further described on the assumption that the ring flash 200 is disposed as shown in (6-1) in FIG. 6. However, a following description may be applied even when the ring flash 200 is disposed as shown in one of (6-2) to (6-7) in FIG. 6.

Figure 7:
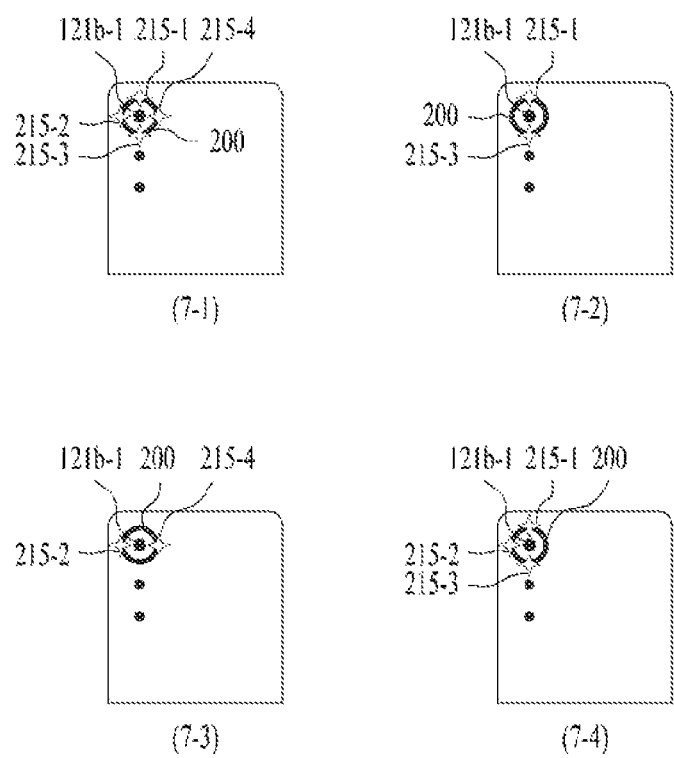
FIG. 7 shows an upper end of a rear surface of a mobile terminal 100 equipped with a plurality of cameras on the rear surface thereof.

FIG. 7 shows the upper end of the rear surface of the mobile terminal 100 equipped with the plurality of cameras on the rear surface thereof.

As shown in (3-1) in FIG. 3 above, the plurality of light emitting devices may be arranged in the light emitting portion 210 of the ring flash 200. In FIG. 7, a description will be achieved assuming that four light emitting elements 215-1, 215-2, 215-3, and 215-4 are respectively arranged at top, bottom, left, and right positions of the light emitting portion 210 for simplicity of the description.

As shown in (7-1) in FIG. 7, when capturing the picture using the first camera 121b-1, the controller 180 may control all of the four light emitting devices 215-1, 215-2, 215-3, and 215-4 to emit light. This may be applied when a maximum amount of light is required for the subject.

Alternatively, as shown in (7-2) in FIG. 7, when capturing the picture using the first camera 121b-1, the controller 180 may control only the first light emitting device 215-1 and the third light emitting device 215-3 among the four light emitting devices 215-1, 215-2, 215-3, and 215-4 to emit light. This may be applied when the maximum amount of light is not required for the subject and/or the subject has a shape extending in the vertical direction. Alternatively, it may be applied when an appropriate brightness is secured with different lighting at positions corresponding to the second light emitting device 215-2 and the fourth light emitting device 215-4 that do not emit light.

Alternatively, as shown in (7-3) in FIG. 7, when capturing the picture using the first camera 121b-1, the controller 180 may control only the second light emitting device 215-2 and the fourth light emitting device 215-4 among the four light emitting devices 215-1, 215-2, 215-3, and 215-4 to emit light. This may be applied when the maximum amount of light is not required for the subject and/or the subject has a shape extending in the horizontal direction. Alternatively, it may be applied when an appropriate brightness is secured with different lighting at positions corresponding to the first light emitting device 215-1 and the third light emitting device 215-3 that do not emit light.

Alternatively, as shown in (7-4) in FIG. 7, when capturing the picture using the first camera 121b-1, the controller 180 may control only the first light emitting device 215-1, the second light emitting device 215-2, and the third light emitting device 215-3 among the four light emitting devices 215-1, 215-2, 215-3, and 215-4 to emit light. This may be applied when the maximum amount of light is not required for the subject and/or an appropriate brightness is secured with different lighting at a position corresponding to the fourth light emitting device 215-4 that does not emit light.

As described above, when capturing the image in a close-up manner using the mobile terminal equipped with the camera having the ring flash embedded therein as described above, an appropriate amount of light may be evenly irradiated to an entirety of the subject, so that a close-up image (a still image or a moving image) of a good quality may be obtained. However, in this case, when an image auto-crop function is applied to the mobile terminal, an image that is captured at a closer distance may be obtained. This will be described with further reference to FIG. 8.

Figure 8:
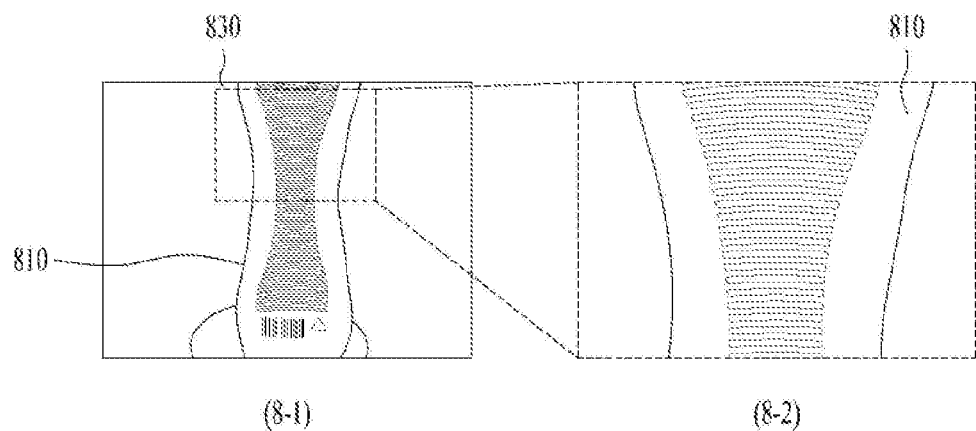
FIG. 8 shows a still image or a moving image captured in a close-up manner by applying an image auto-crop function.

FIG. 8 shows a still image or a moving image captured in a close-up manner by applying an image auto-crop function.

Alternatively, as shown in (8-1) in FIG. 8, the controller 180 may control the camera 121b to obtain a preview image for a subject 810. In this connection, the preview image may mean a still image or a moving image that is captured and received, by the camera 121b, in real time before being stored in the memory.

When a capturing command is received from the user, the controller 180 may control to auto-crop and store a specific portion 830 in the preview image as shown in (8-2) in FIG. 8. The specific portion 830 may be automatically determined based on a focus position in the preview image. The auto-cropped image may show an effect of being captured at a closer distance.

In one example, when capturing the image in the close-up manner using the mobile terminal equipped with the camera having the ring flash embedded therein as described above, a shadow of the subject may be captured to a minimum, so that it may be advantageous for image segmentation processing, which extracts the subject from the close-up image. This will be described with further reference to FIG. 9.

FIG. 9 is a view for the illustrating segmentation processing of the image captured by the camera equipped with the ring flash.

Alternatively, as shown in (9-1) in FIG. 9, when the ring flash 200 does not emit the light, a shadow 920 resulted from ambient light may be generated around a subject 910.

However, it may be seen that the shadow 920 around the subject 910 disappears as shown in (9-2) in FIG. 9 when the ring flash 200 emits the light. Instead, a new shadow (not shown) may be generated behind the subject 910 resulted from the light emission of the ring flash. However, during the close-up capturing, the new shadow is obscured by the subject 910 and thus does not appear in the captured image.

Therefore, as shown in (9-3) in FIG. 9, because the shadow 920 around the subject 910 disappears, the controller 910 may clearly recognize a boundary between the subject 910 and a background 950 thereof from the captured image. Thus, the image segmentation processing for extracting the subject 910 from the captured image may be efficiently performed.

As shown in (9-4) in FIG. 9, the controller 180 may generate an image obtained by synthesizing the extracted subject 910 and a new different background 955.

In one example, in performing the image segmentation processing, when both an image (that is, the image such as (9-1) in FIG. 9) captured when the ring flash 200 does not emit the light and an image (that is, the image such as (9-2) in FIG. 9) captured when the ring flash 200 emits the light are used, the two captured images are compared to each other, so that the boundary between the subject 910 and the background 950 thereof may be more clearly recognized. Thus, the image segmentation processing may be efficiently performed.

In addition, when capturing the image in the close-up manner using the mobile terminal equipped with the camera having the ring flash embedded therein, following effects may be obtained.

Gloss, sparkle, and texture of a subject such as a shiny ring may be well expressed.

Strong light of a strobe causes a contrast of the subject to be too high to express a texture of a surface material thereof in detail, but such problem is able to be solved when using the ring flash. In a case of fabrics, a texture may be well expressed in a very realistic manner.

The ring flash emphasizes a three-dimensionality and highlights a clearness when capturing an overlapping or three-dimensional object, so that a bright picture with a bright background may be output.

Sufficient amount of light is secured, so that a shutter speed may be set high. Thus, a fast moving subject may be accurately and clearly captured through high-speed synchronization.

Hereinabove, the structure in which the ring flash is coupled with the camera embedded in the rear surface of the mobile terminal has been described. However, in one example, the ring flash may be coupled with a camera embedded in the front surface of the mobile terminal in substantially the same structure as the structure described above.

Effects of the mobile terminal and the method for controlling the same according to the present invention are as follows.

According to one aspect of the present invention, even when the image is captured in the close-up manner, a uniform and appropriate amount of light in a wide region for the subject may be secured.

In addition, according to another aspect of the present invention, the ring flash may be embedded in a main body of the mobile terminal in an airtight manner together with the camera, which, for example, is advantageous for waterproofing.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a rear cover having an opening defined therein;
a camera disposed to be optically exposed to the outside through the opening;
a flash surrounding the camera, wherein the flash is disposed to be optically exposed to the outside through the opening;
a support frame surrounding the flash and being attached to one surface of the rear cover corresponding to a periphery of the opening while being externally exposed to the outside through the opening; and
a cover glass attached to the support frame to cover the camera and the flash,
wherein the rear cover includes a first cover and a second cover,
wherein the opening is defined in the first cover and an opening having a larger diameter than the opening is defined in the second cover,
wherein the first cover and the second cover overlap with each other such that centers of the respective openings correspond to each other, and
wherein the support frame is attached to one surface of the first cover exposed from the second cover.

2. The mobile terminal of claim 1, wherein the first cover is made of a glass material.

3. The mobile terminal of claim 1, wherein the support frame is inserted into the opening in a direction from the one surface of the rear cover to an opposite surface of the one surface of the rear cover to protrude from the rear cover.

4. The mobile terminal of claim 3, wherein the one surface of the rear cover is directed inward of a main body of the mobile terminal, and the opposite surface of the rear cover is directed outward of the main body.

5. The mobile terminal of claim 1, wherein a cross-section of a light emitting portion of the flash is semicircular.

6. The mobile terminal of claim 1, further comprising:
a plurality of cameras,
wherein the flash is disposed to surround a camera for close-up among the plurality of cameras.

7. The mobile terminal of claim 6, wherein the flash is able to operate in conjunction with not only the camera for the close-up but also with other cameras among the plurality of cameras.

8. The mobile terminal of claim 3, wherein the cover glass is attached to the support frame in an airtight manner, and the support frame is attached to the rear cover in an airtight manner.

9. The mobile terminal of claim 8, wherein the support frame includes a protruding portion inserted into the opening, and a fixed portion extending parallel to the rear cover and fixed to the rear cover, wherein a step is formed at an end of the protruding portion, and the cover glass is seated on the step.

10. The mobile terminal of claim 9, wherein one surface of the fixed portion is attached to the rear cover with an adhesive tape, and wherein another surface of the fixed portion faces a printed circuit board (PCB) of the camera.

\* \* \* \* \*